Dec. 29, 1925. 1,567,983
H. PRELLER
APPARATUS FOR SEPARATING AND EXTRACTING MINERAL OILS FROM OILY SAND,
BITUMEN FROM OILY CHALK, OILY SLATE, COAL, ETC
Filed Dec. 9, 1922 5 Sheets-Sheet 1

Inventor:
Heinrich Preller

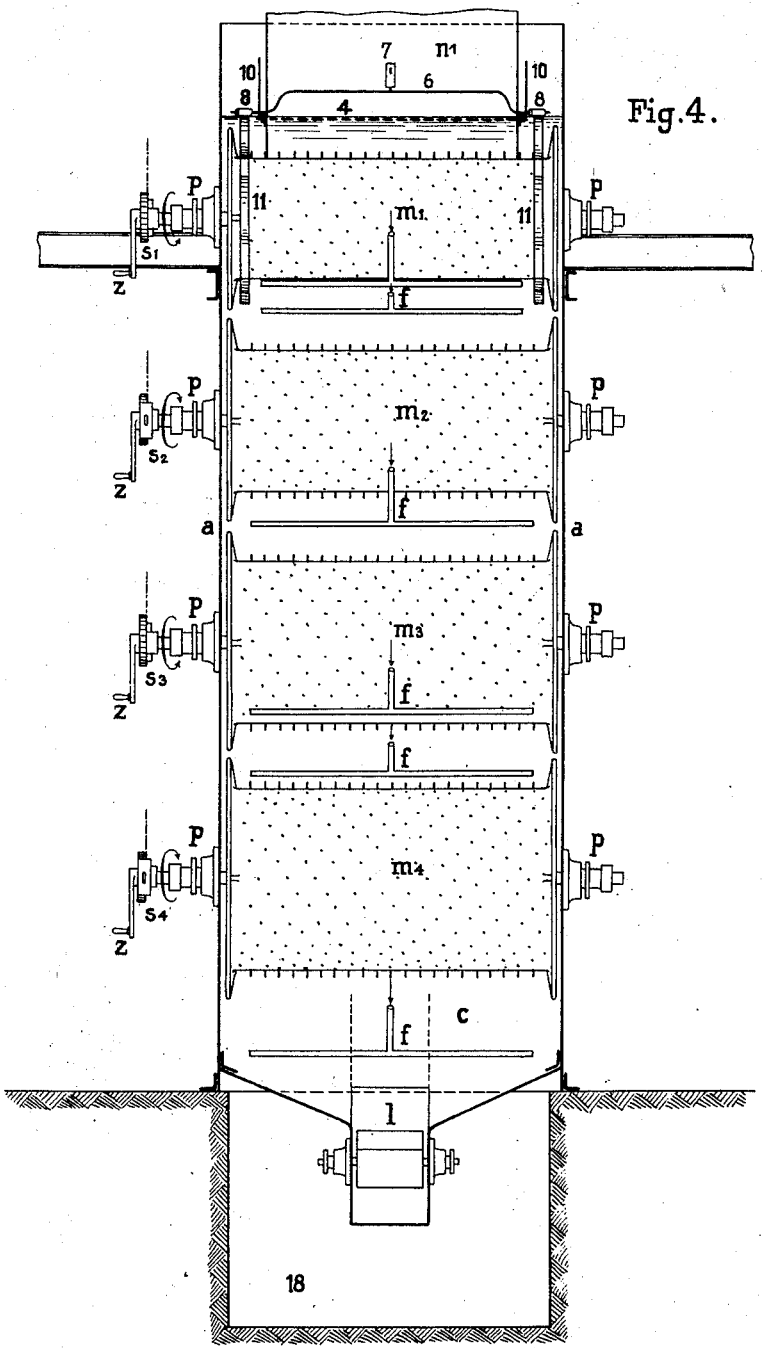

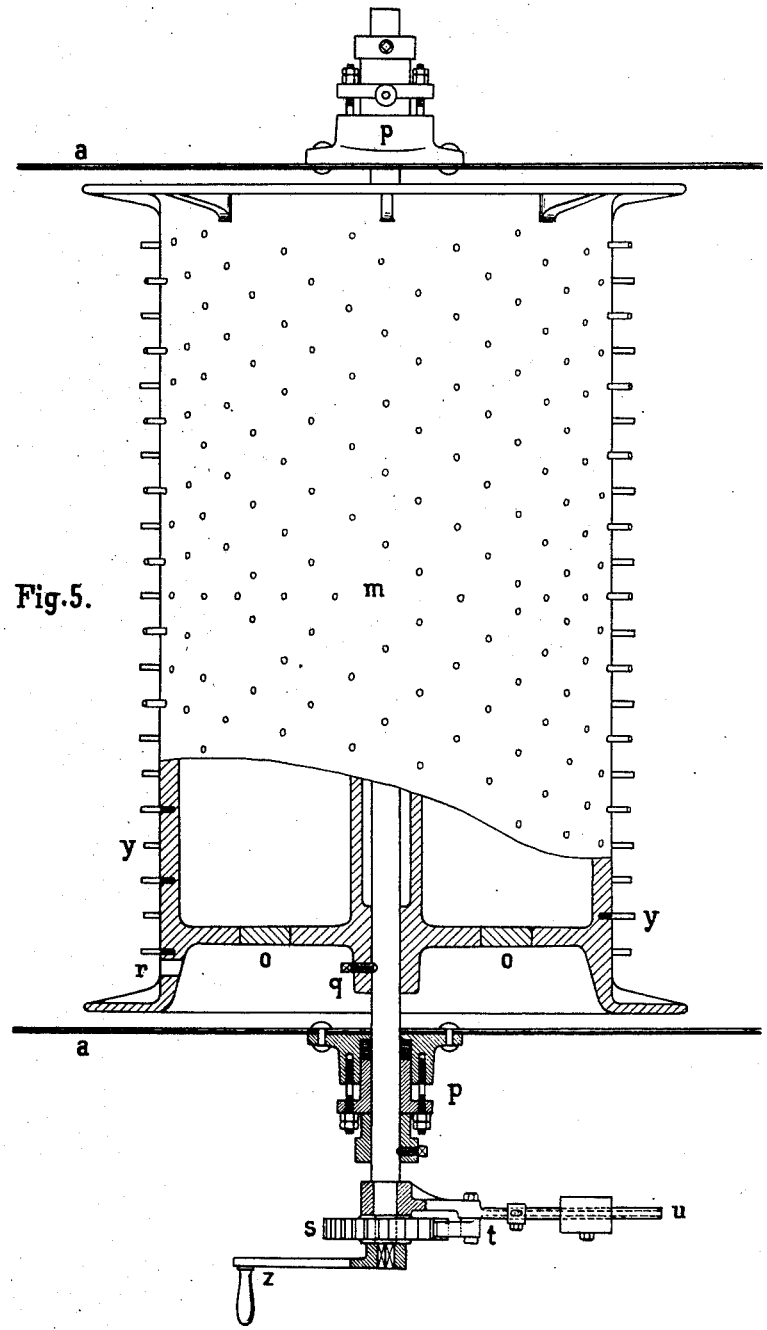

Patented Dec. 29, 1925.

1,567,983

UNITED STATES PATENT OFFICE.

HEINRICH PRELLER, OF BERLIN-FRIEDENAU, GERMANY.

APPARATUS FOR SEPARATING AND EXTRACTING MINERAL OILS FROM OILY SAND, BITUMEN FROM OILY CHALK, OILY SLATE, COAL, ETC.

Application filed December 9, 1922. Serial No. 605,997.

*To all whom it may concern:*

Be it known that I, HEINRICH PRELLER, of Czech nationality, residing at Berlin-Friedenau, Germany, have invented certain new and useful improvements in apparatus for separating and extracting mineral oils from oily sand, bitumen from oily chalk, oily slate, coal, etc., of which the following is a specification.

At oil-bearing places, where crude oil is obtained from the bore-holes by scooping, considerable quantities of oily sand are brought to the surface. According to the formation of the rock at such places, these oily sands, mixed more or less with clay or other gangues, after they have been brought to the surface, by reason of their capillarity still contain considerable quantities of oil which, after the sand has been dumped on to the dump heaps, vanish into the ground and only to a very small extent are recovered in the shape of drop-oil from recesses at the foot of the dump heaps.

Similar conditions prevail where the oil-bearing place is worked as a mine, in which case the extracted rock, also containing a considerable amount of oil, is in the same manner thrown as a worthless material upon the dump heap.

The object of this invention is to recover the large quantities of oil which, owing to capillarity, are retained in oily rocks and which heretofore have almost completely been lost. This object is achieved by causing the materials to be separated, viz the oily sand and the like to meet a constantly circulating current of hot water, whereby separation of the oil from the sand is effected. The former rises in the water bath or is carried by the current of washing water to the top where it is collected and drawn off, while the specifically heavier components, viz the sand and the like sink to the bottom whence they are removed in a suitable manner.

The hot current of water rising in the washing reservoir may, at the upper end of the washing chamber, be divided into two streams which pass off in opposite directions, whereby the washing and clarifying effect is considerably increased, since in such case the quantities of water as well as the speed of the current of washing water passing down in the clarifying chambers can be reduced and the water level below the feeding device remains free from crude oil.

To the hot washing-water-currents solvents or lixiviating means may be added in the shape of chemicals, such as acids, salts and the like which at the same time increase the specific gravity of the hot water bath and thereby considerably accelerate the washing and clarifying process.

In the accompanying drawings wherein several forms of apparatus for carrying out the process are shown:

Figure 7:
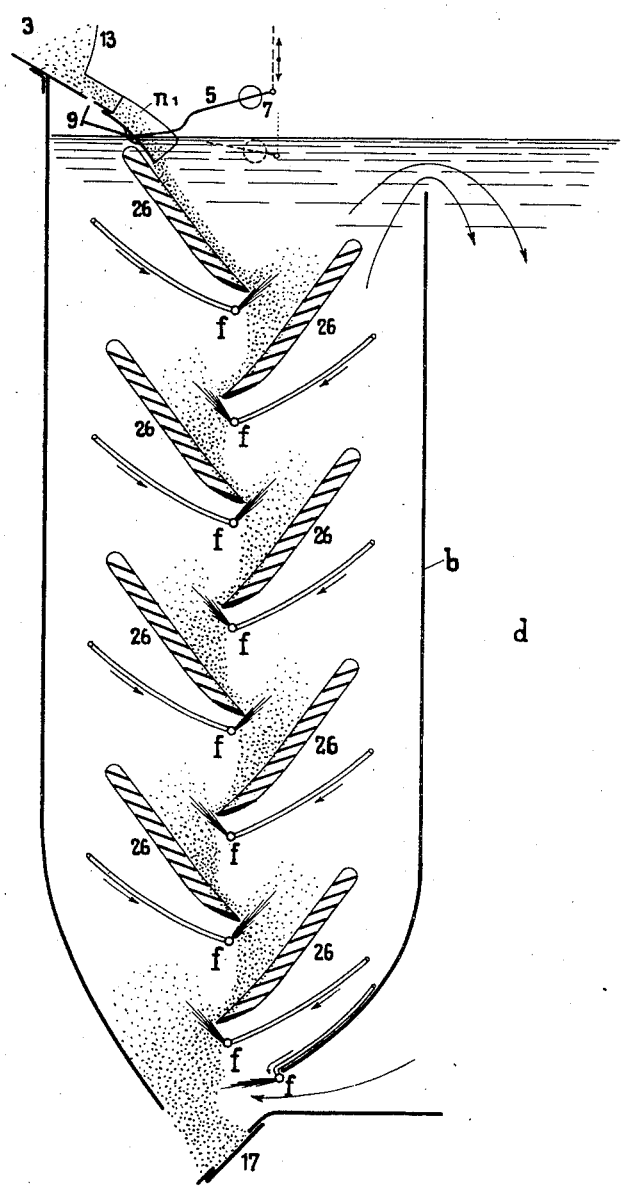
Figure 8:
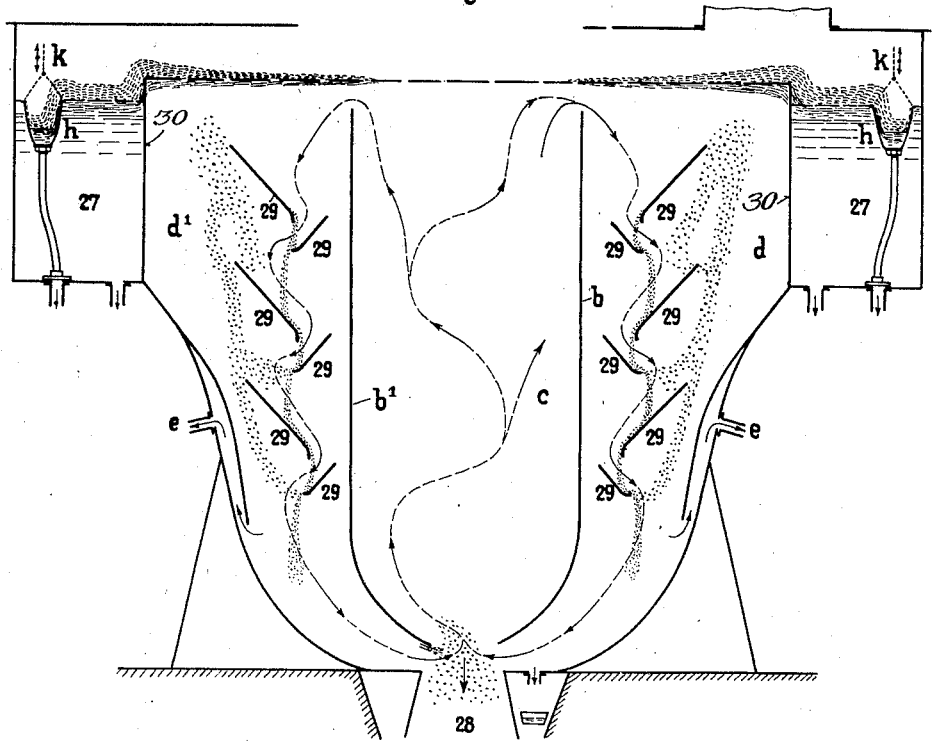

Fig. 4 is a side view of the washing reservoir after the removal of the side wall or separating wall respectively, Fig. 5 is a partial section of washing drums together with accessories, Fig. 6 is a view of a detail of Fig. 5, Fig. 7 shows a modified form of construction, wherein the wash drums are replaced by step grates, Fig. 8 is a diagrammatic view of another form of construction having two clarifying chambers.

Figure 1:
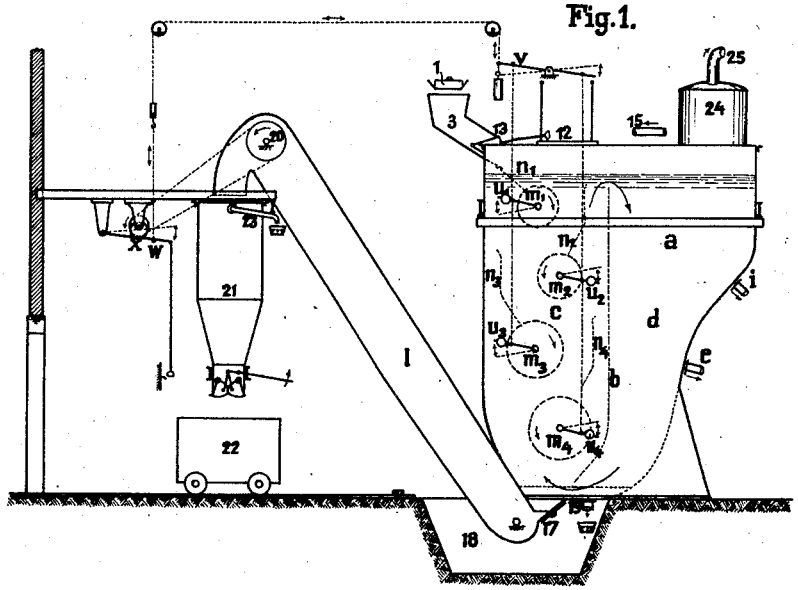
Fig. 1 shows the general arrangement of the installation.
Figure 2:
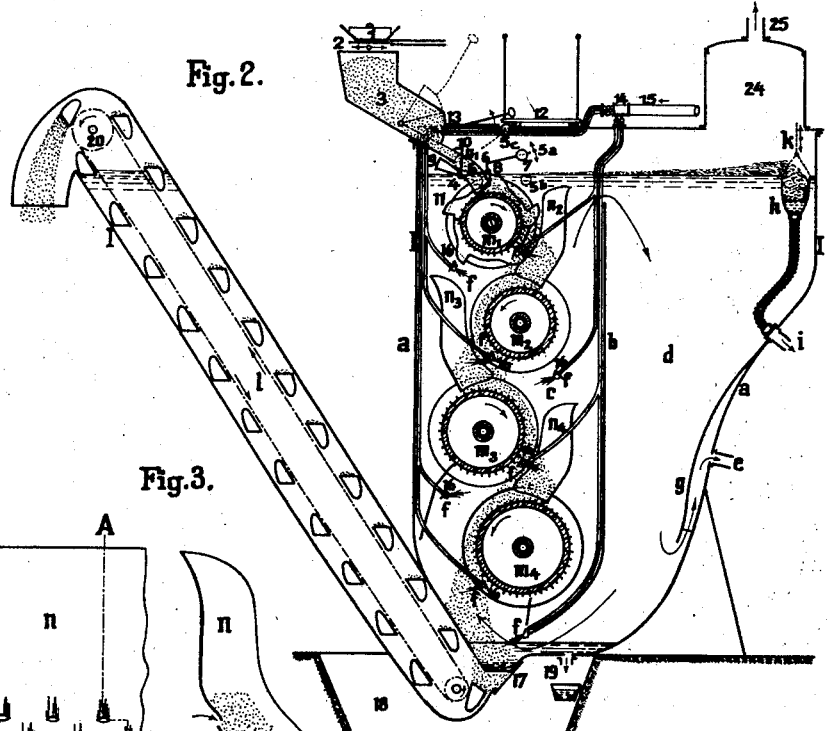
Fig. 2 is a vertical section of Fig. 1.
Figure 3:
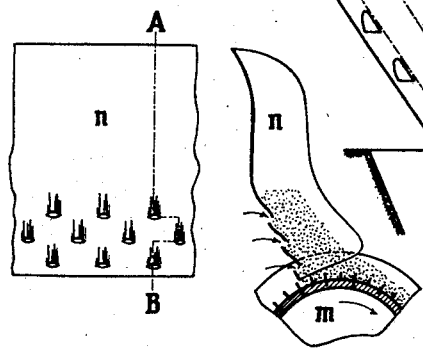
Fig. 3 is a view of a detail.

In Figures 1 and 2 the wrought iron reservoir $a$ is shown as divided by the separating wall $b$ of sheet iron into the chambers $c$ and $d$. Since the separating wall $b$ does not reach to the bottom of the reservoir and the upper edge of said wall lies at a suitable distance below the surface of the hot washing water, the washing water is drawn by a pump from the chamber $d$ by the pipe socket and, by means of the blow pipes $f$, is forced into the chamber $c$ in such a manner that a continual and highly effective hot water circulation from the chamber $d$ to the chamber $c$ is produced. In front of the suction pipe socket $e$ a sheet iron apron $g$ is fixed. This apron $g$ extends deeply into the reservoir $a$ and prevents impurities carried by the water from entering the pump. In the chamber $c$, in which the washing drums are arranged, the washed oil by virtue of its low specific gravity rises with the hot current, collects on the top of the water and finally flows into the funnel $h$, in order to pass out at the outlet $i$ through the attached metal-hose. The funnel $h$ is adjustable and suspended from a chain $k$ so that it can be raised or lowered according to the height of the level of the oil. By means of the funnel $h$ the emulsion produced by the washing process can also be drawn off with the out-flowing oil. In order to accelerate the deposition of the emulsion, the sheet iron funnel $h$ is preferably fitted with sharply serrated overflow edges and wire points. In addition the high column of water in the chamber $d$ insures a safe rising of the smallest quantities of oil which could be forced along by the water circulation within this chamber and the deposit at the bottom of the reservoir $a$ of muddy and finely grained impurities carried along by the circulating washing water, said impurities, together with the washed-out sand, being conveyed to the dump heap by means of the elevator $l$.

The arrangement of the washing drums $m_{1-4}$ and of the shields $n_{1-4}$ in the chamber $c$ is shown in Fig. 2. The core-holes $o$ (Fig. 5) on the front bottoms of the cast iron drums $m_{1-4}$ are closed in a water tight manner, whereby the drums become floating bodies, in order to have at the stuffing boxes $p$ as small a bearing pressure as possible. Every drum is secured to its shaft by means of a set screw $q$ (Fig. 5) which can be tightened or slackened by means of a box-key inserted through an opening $r$ of the drum. The drum-shaft journals projecting on one side of the reservoir $a$ are each fitted with a ratchet wheel $s$ which is actuated by means of a weighted lever $u$ carrying a pawl $t$ (Figs. 5 and 6) which together are actuated by means of a double lever $v$ (Fig. 1) and an automatic chain-feeding mechanism. The latter is driven by means of a single lever $w$ (Fig. 1) which, by means of the eccentric disc $x$ keyed to the driving shaft of the bucket elevator $l$, is made to oscillate and thereby slowly and intermittently rotate the washing drums $m_{1-4}$. In order to ensure a safe running of the automatic chain feeding mechanism and also to regulate the speed of the various washing drums, all levers and weights are adjustable on the levers $u_{1-4}$. If the rod fastened to the single lever $w$ is pulled downwardly and secured to a fixed hook the lever is moved out of the path of movement of the eccentric $x$ and thereby the chain-feeding mechanism comes to a standstill independently of the other moving parts of the machine.

Each of the drums is larger in diameter than the one immediately above it in order to spread the oily sand in a step like manner to a greater extent the nearer it approaches the end of the washing process. For the same reason the drum-covers are provided with steel pins $y$ (Fig. 5) arranged similarly to the teeth of double helical spur wheels. The same end can also be attained for instance by means of distributing ledges of angle iron secured to the periphery of the drums. Thereby the oily sand falling from the uppermost drum $m_1$ on to the second $m_2$ is forced to spread, while the oily sand of the second drum $m_2$ is thrown more towards the wide centre part of the third drum $m_3$. From this one again—just as in the case of the first drum $m_1$ on to the second drum $m_2$—the oily sand is spread on to the fourth drum $m_4$, in order to fall from here as much as possible on to the centre of the bucket elevator $l$.

In order that the oily sand lying on the washing drums may be pierced and played upon by the washing water also from the side of the breast shields $n_{1-4}$ (Fig. 2), the latter are preferably perforated up to the height, where the oily sand is lying. The continuous hot water current acts according to the counter current principle upon the oily sand falling from drum to drum and which at the same time is spread more and more in a step-like manner, whereby the washing process is made very intensive and the oil is completely separated from the oily sand.

In Figure 7 of the drawings a modified construction of the device is shown, wherein a number of step grates 26 arranged in a zigzag one above another, are substituted for the previously described drums. These grates 26 are fixed in such inclined position and at such a distance apart that the raw material is compelled to pass through the washing chamber $c$ from above downward in a zigzag path and in a direction opposite to the flow of the hot water.

Previous to a stopping of the washing apparatus a long period, the feeding device must be stopped, while the chain feeding mechanism and the elevator $l$ continue to run for a short period in order that all the oily sand within the apparatus may be washed and thrown out and may not cake on the wash drums nor choke the elevator $l$. In order that the washing drums may be thoroughly cleansed, removable handles $z$ (Figs. 4, 5, 6) are provided for the shafts of the drums $m'$, $m^2$, $m^3$ and $m^4$, by means of which it is possible to rotate the drums, if necessary at a greater speed than they are normally rotated by the advancing mechanism.

From the bucket trough $l$ (Fig. 2) the oily sand drops through the slide 2 into the chute 3 of the feeding device, the closing of which is effected by two three-armed bell crank levers, one on each side of the outlet, and which are keyed to the ends of a common spindle 4 and rotatably mounted beneath the breast shields $n_1$. The arms 5 of these two three-armed bell crank levers are rigidly connected by a crank rod 6 whose projecting ends are each fitted with a cam roller 8 and a weight 7 is carried by said crank. The arm 9 of said bell-crank levers carry the circular-slide cutting knife for opening and closing the trough outlet during the automatic movement. The pair of shanks 10 also carry a knife for a sudden and permanent stopping of the feeding device. The automatic controlling of the feeding device is effected by means of two cam discs 11, one mounted on either side of the washing drums $m_1$ and acting upon the cam rollers 8. The discs 11 may be exchangeable for obtaining the required slower or quicker automatic actuation of the closing means of said outlets which is necessary according to the prevailing size of sand and the condition of the material to be washed out, the shape of the discs and number of projections has to be altered accordingly.

The lever positions $5^a$ and $5^b$ in Fig. 2 show the feeding device in the opened or closed position during the automatic movement. If the lever controlling device is, by means of a chain on the rod 6, brought into the position $5^c$ and is here arrested, the trough outlet, without the remaining moving machine parts being affected, is permanently closed by means of the locking-knife mounted on the pair of arms 10.

In case the oily sand should accumulate at the large manually operable circular slide 13 and for some reason choke the outlet opening, this circular slide 13 is lifted up until the oily sand can flow out, whereupon it is returned to its former position.

The water bath within the reservoir $a$, which can always be replenished from the service line, is heated by means of the flow of exhaust steam, hot air or the like through the blow pipes $f$ to a temperature close to the boiling point and kept at this temperature during the whole washing process. According to Fig. 2 the blow pipes $f$ are connected in pairs to the valve head 14 of the main pipe line 15 which permits an independent regulation of the current speeds in the pairs of blow pipes. This heat supply effects a continuous circulation of water from the chamber $d$ into the chamber $c$ which, according to requirements, is vigorously supported by a hot water pumping installation between the pipe-socket $e$ and the main pipe line 15.

In order to obtain the highest possible efficiency when washing the oily sand, it is recommended that there be dissolved in the hot water current emulsion breaking means such as hydrochloric acid, sulphuric acid, etc., materials well tried in the oil industry.

The length of the separate blow pipes $f$ (Fig. 4) is almost equal to the width of the drum. They are perforated throughout their entire length and in every case only towards the side where the current of steam or hot water meets the oily sand dropping from drum to drum so that the oil is entirely washed out of the sand or other impurities.

In order that the outlets of the blow pipes $f$ may not—while the hot water circulation has been cut off—become blocked with rocky material, which owing to its weight will drop into the bath or become choked with sand, they are mounted with protecting plates 16 (Fig. 2).

When constructing the plant special attention must be paid to the closed elevator $l$ (Fig. 2) with which the hot washing-water communicates and which under all circumstances must work in an unobjectionable manner. Flat buckets with round bottoms are employed; the bearings of the chain sprockets at the lower end of the elevator are provided with stuffing box packings and must be so constructed that they can be easily exchanged. In order that the elevator boot and the man-hole 17 may be easily accessible, a pit 18 of a suitable depth is provided which, during the working of the apparatus, may be covered by planks. In order that the washed-out sand or clay-mud dropped into the boot may be scooped up by the buckets in a reliable manner, the lower end of the reservoir $a$ is not arranged tangentially to the lower end of the boot, but according to Fig. 2 is slightly higher than the latter and a man-hole lid 17 is provided at the junction of the lower end of the reservoir with the boot in order to be able to readily cleanse the washing apparatus when required, in which case the washing water and the mud collected on the bottom of the reservoir $a$ is allowed to drain into a trough beneath the same by opening a cut-off slide fitted to the flanged socket 19.

The elevator is driven in any suitable manner through the upper guide roller 20.

The sand or clay-mud, completely freed from oil and washed, passes by means of the elevator $l$ from the washing apparatus into the hopper 21 (Fig. 1), the outlet of which is fitted with a suitable closure, into tipping trucks 22 running on small gauge rails on to the dump heap. Washing water which may have been conveyed by the elevator $l$ into the hopper 21 passes out through an overflow pipe 23 into a drainage trough.

If during the washing of the oily sands inflammable or unpleasant vapours are produced, the washing apparatus must be closed air tight and fitted with a steam hood 24 (Figs. 1 and 2). From the pipe 25 these vapours may then be drawn off in order to be utilized.

In the case of the modification shown in Fig. 8, the middle or washing chamber $c$ is surrounded by two clarifying chambers $d$, $d^1$. The direction of the flow of the hot washing water in the clarifying chambers is indicated by arrows. This washing water is divided at the upper end of the washing chamber $c$ into two streams which pass over the separating walls, $b$, $b^1$ into the clarifying chambers $d$, $d^1$ arranged on opposite sides of the washing chamber $c$. Within these clarifying chambers is arranged a number of step grates 29 or sheet iron bottoms (similar to the arrangement shown in Fig. 7) arranged zigzag, one above the other and inclined and at a suitable distance from one another and over which the material carried by the stream of water is passed on a zigzag path, in which case a reliable washing also of this finely distributed raw material is effected, and the remaining oil particles rise to the top of the water in the clarifying chambers, $d$, $d^1$.

The arrangement of a clarifying chamber $d$ on each side of the washing chamber $c$ has the advantage that the latter is protected in a better manner against losses of heat also that on the surface of the water in the centre of the washing chamber by reason of the division of the hot water flow only a comparatively very thin layer, or almost no layer of oil at all can accumulate, and finally that the quantity of water and thus the speed of the washing water flow passing downward in the clarifying chambers are decreased.

The raw material, freed from oil, on leaving the washing chamber drops through a large outlet 28 either—as shown in Figure 2—into an elevator trough or into any suitable sluice device (not shown on the drawing) from which the washed-out material is removed from time to time or used immediately for other purposes.

At the upper part of every clarifying chamber is a secondary clarifying reservoir 27 in which secondary reservoir the accumulating troughs or hoppers $h$ are vertically adjustable by means of chains $k$. The washed-out crude oil and the emulsion formed during the washing process is driven by the water current against the separating walls 30 and overflows into the settling tanks 27, where the crude oil and emulsion are allowed to remain at rest for a considerable length of time for the purpose of clarification in order to then flow out of the apparatus in the manner shown in Figure 8.

To insure the greatest possible utilization of the heat, it is necessary to protect as far as possible all parts of the large washing reservoir $a$ by means of covers against the radiation of heat and to cover all steam- and hot water pipe-lines with a poor heat-conducting material. For the same reason, the hollow washing drums $m_{1-4}$ and the separating wall $b$ in the reservoir $a$ can be constructed of heat-conducting material to be heated by means of superheated steam or heating gases and the like.

Finally it may be pointed out that the washing apparatus can also be made of a width of several metres. In such a case it is only necessary that several feeding devices and elevators be suitably mounted in pairs side by side on the common large reservoir $a$. The narrow washing apparatus with only one feeding device and one elevator are preferred to this wide construction, as necessary repairs can be more easily carried out and in such cases not such a large set of machines comes to a standstill.

The washed-out sand offers a considerable source of profit, as it is in great demand for the manufacture of sand-lime bricks and other purposes.

The washing apparatus may be used for the recovery or separation of all materials, such as bitumen from oily chalk, oily slate, coal, also of peat and the separation of other oils and organic fats from various raw materials, waste products and the like.

I claim as my invention:

1. In a device for recovering mineral oils and bitumens from substances containing the same, a reservoir adapted to contain a treating liquid, a set of drums in said reservoir, the alternate drums of said set being rotatable in opposite directions whereby the material undergoing treatment advances in a zigzag path.

2. A device as set forth in claim 1 provided with inlet pipes discharging treating fluids on the material undergoing treatment during its passage from one drum to the next lower one.

3. A device as set forth in claim 1 wherein the diameters of the drums increase successively from the first one to the last one.

4. A device as set forth in claim 1 wherein the peripheries of the drums are provided with pins to spread out the material undergoing treatment.

5. A device for treating oil and bitumen carrying substances which comprises a treatment reservoir, a vertical wall dividing said treatment reservoir into two chambers but allowing communication between the chambers both above and below the wall, and means for feeding substances to be treated into one of said chambers.

6. A device as set forth in claim 1 wherein a tray-like guide plate perforated on its lower part is fixed above each drum.

7. A device as set forth in claim 5 wherein the chamber not provided with the feeding means is supplied with a vertically adjustable accumulating hopper for conducting away the washed out crude oil and emulsion produced during the washing process.

In testimony whereof I have signed my name to this specification.

HEINRICH PRELLER.